US010863426B2

(12) United States Patent
Tao et al.

(10) Patent No.: US 10,863,426 B2
(45) Date of Patent: Dec. 8, 2020

(54) TERMINAL ASSOCIATED WITH A FIRST BASE STATION ACCESSING A NETWORK VIA A SECOND BASE STATION

(71) Applicant: ALIBABA GROUP HOLDING LIMITED, George Town, Grand Cayman (KY)

(72) Inventors: Zhen Tao, Hangzhou (CN); Xiaobo Yu, Beijing (CN); Dapeng Liu, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/352,769

(22) Filed: Mar. 13, 2019

(65) Prior Publication Data

US 2019/0289536 A1    Sep. 19, 2019

(30) Foreign Application Priority Data

Mar. 12, 2018  (CN) .......................... 2018 10 206061
Mar. 23, 2018  (CN) .......................... 2018 10 246619

(51) Int. Cl.
*H04W 48/16*     (2009.01)
*H04W 92/10*     (2009.01)

(52) U.S. Cl.
CPC ............ *H04W 48/16* (2013.01); *H04W 92/10* (2013.01)

(58) Field of Classification Search
CPC ..... H04W 48/16; H04W 92/10; H04W 92/00; H04W 48/12; H04W 48/18; H04W 48/20;

(Continued)

(56) References Cited

U.S. PATENT DOCUMENTS 5,345,448 A * 9/1994 Keskitalo ..................... 370/95.3
6,574,266 B1   6/2003 Haartsen
(Continued)

OTHER PUBLICATIONS

PCT International Search Report and Written Opinion dated May 23, 2019, issued in corresponding International Application No. PCT/US2019/022075 (19 pages).

(Continued)

*Primary Examiner* — Meless N Zewdu
(74) *Attorney, Agent, or Firm* — Finnegan, Henderson, Farabow, Garrett & Dunner, LLP

(57) ABSTRACT

The present disclosure provides a terminal, a base station and methods for communications between the terminal and the base station, and for the terminal to access a network. According to one exemplary method, a terminal sends a first message to a base station via a first channel, the first message being used to request access to a network. The terminal receives a second message from a first base station via a second channel, the second message including channel plan information for determining a first network connection plan. The terminal determines the first network connection plan according to the channel plan information and accesses the network via a second base station according to the first network connection plan. Channel use plan of the base station can be obtained through signaling interactions in the process of network connection. The terminal can determine whether the network can be accessed and access the network accordingly.

27 Claims, 5 Drawing Sheets

(58) Field of Classification Search
CPC ... H04W 76/00; H04W 28/08; H04W 28/085;
H04W 28/10; H04W 28/12; H04W 28/16;
H04W 28/20; H04W 28/18; H04W 28/22;
H04W 28/24; H04W 28/26; H04W 16/06;
H04W 16/08; H04W 16/10; H04W 16/12;
H04W 16/14; H04W 74/00; H04W
72/002; H04W 74/004; H04W 74/006;
H04W 88/00; H04W 88/02; H04W 88/08;
H04W 72/04; H04W 72/00; H04W
72/044; H04W 72/0446; H04W 72/0453;
H04W 72/048; H04W 72/0486; H04W
72/0493; H04W 72/08; H04W 72/10;
H04W 72/12; H04W 72/1252; H04W
72/1257; H04W 72/14; H04W 72/1289;
H04W 48/02; H04W 48/14; H04W 4/20;
H04W 28/00; H04W 28/0257; H04W
28/0263; H04W 48/08; H04W 72/02;
H04W 88/18; H04W 72/1263; H04W
76/10; H04W 76/11; H04W 76/15; H04W
48/00; H04W 72/0426
See application file for complete search history.

(56) References Cited

U.S. PATENT DOCUMENTS

| | | | | |
|---|---|---|---|---|
| 8,305,994 | B1* | 11/2012 | Vargantwar et al. | 370/331 |
| 8,553,617 | B1* | 10/2013 | Shmidt | 370/328 |
| 9,237,453 | B2* | 12/2016 | Steer et al. | H04W 16/14 |
| 10,477,412 | B2* | 11/2019 | Hahn et al. | H04W 16/18 |
| 10,565,841 | B2* | 2/2020 | Emmanuel et al. | G08B 13/22 |
| 2001/0023185 | A1 | 9/2001 | Hakkinen et al. | |
| 2008/0311923 | A1* | 12/2008 | Petrovic et al. | 455/450 |
| 2009/0077237 | A1* | 3/2009 | Brehon et al. | 709/226 |
| 2009/0190553 | A1 | 7/2009 | Masuda et al. | |
| 2009/0247206 | A1* | 10/2009 | Yacono | 455/515 |
| 2010/0303028 | A1* | 12/2010 | Gresset et al. | 370/329 |
| 2011/0164575 | A1* | 7/2011 | Brunel et al. | 370/329 |
| 2012/0188875 | A1* | 7/2012 | Stamoulis et al. | 370/235 |
| 2013/0039344 | A1* | 2/2013 | Lee et al. | 370/331 |
| 2013/0122924 | A1 | 5/2013 | Yie et al. | |
| 2013/0142112 | A1* | 6/2013 | Yang et al. | 370/328 |
| 2014/0348095 | A1* | 11/2014 | Nogami et al. | H04W 72/042 |
| 2016/0021661 | A1* | 1/2016 | Yerramalli et al. | H04W 72/0453 |
| 2016/0262163 | A1* | 9/2016 | Gonzalez Garrido et al. | H04W 72/082 |
| 2017/0064622 | A1* | 3/2017 | Wang et al. | H04W 48/20 |
| 2017/0135115 | A1* | 5/2017 | Cho et al. | H04W 72/085 |
| 2018/0248983 | A1* | 8/2018 | Mohebbi et al. | H04L 69/08 |
| 2019/0082447 | A1* | 3/2019 | Harsha et al. | H04W 72/1231 |
| 2019/0141142 | A1* | 5/2019 | Filippou et al. | H04L 67/16 |
| 2019/0281608 | A1* | 9/2019 | Huang et al. | H04W 72/10 |

OTHER PUBLICATIONS

Raniwala, A. et al., Architecture and algorithms for an IEEE 802.11-based multi-channel wireless mesh network, Proceedings IEEE 24th Annual Joint Conference of the IEEE Computer and Communications Societies, Mar. 13-17, 2005, (13 pages).

* cited by examiner

TERMINAL ASSOCIATED WITH A FIRST BASE STATION ACCESSING A NETWORK VIA A SECOND BASE STATION

CROSS-REFERENCE TO RELATED APPLICATION

This application claims the benefits of priority to Chinese Application No. 201810206061.1, filed on Mar. 13, 2018, and Chinese Application No. 201810246619.9, filed on Mar. 23, 2018, both of which are incorporated herein by reference in their entireties.

TECHNICAL FIELD

The present disclosure generally relates to the field of communication technologies, and in particular, to a terminal, a base station, and methods for communications between the terminal and the base station and for the terminal to access a network.

BACKGROUND

Internet of Things (IoT) technologies represent the third information technology revolution after computers and the Internet. IoT technologies provide advantages such as real-time communication and better interactivity and have been extensively applied in many fields, including urban management, digital home, positioning and navigation, logistics management, and security systems. Among the IoT related technologies, LoRaWAN (Long Range Wide Area Network) is a project for long-range transmission based on spread spectrum technologies. LoRaWAN provides features like long transmission distance, low power consumption, multiple nodes, and low cost. According to existing data transmission methods, a LoRaWAN typically comprises a terminal, a base station and a server.

Generally, channel use plans for connecting terminals and base stations are uniform. Different manufacturers, however, may adopt different channel use plans, leading to inconsistency and incompatibility. As a result, a terminal may not be able to connect to a base station.

SUMMARY

In view of in the above problems, embodiments of the present disclosure provide a terminal, a base station and methods for communications between the terminal and the base station, and for the terminal to access a network.

According to some embodiments of the present disclosure, methods for communications between a terminal and a base station are provided. According to one exemplary method, a terminal can send a first message to at least one base station via a first channel, the first message being used to request access to a network and the first channel being within a first channel set. The terminal can receive a second message from a first base station via a second channel, the second message comprising channel plan information, the channel plan information being used to determine a first network connection plan, and the second channel being within the first channel set. The terminal can then determine the first network connection plan according to the channel plan information and accesses the network via a second base station according to the first network connection plan.

In some embodiments, the methods can further include the following procedures. The terminal can send the first message to the base station sequentially via at least one third channel within the first channel set. The terminal can receive the second message from the first base station via a fourth channel, the fourth channel being within the first channel set.

According to some embodiments, the terminal can be preset with at least one network connection plan and channel plan information corresponding to the at least one network connection plan.

In some embodiments, the second message can further include a channel mask, the channel mask being used to map a first channel subset of the first network connection plan. The terminal can determine the first channel subset according to the channel plan information and the channel mask and can access the network via the second base station according to the first channel subset.

According to some embodiments, the second message can further include at least one channel plan information mask, the channel plan information mask being used to map at least one first network connection plan.

According to some embodiments of the present disclosure, methods for communications between a terminal and a base station are further provided. According to one exemplary method, a base station can receive a first message from a terminal via a first channel, the first message being used to request access to a network and the first channel being within a first channel set. The base station can send a second message to the terminal via a second channel, the second message including channel plan information. The channel plan information can be used to determine a first network connection plan. The second channel can be within the first channel set.

In some embodiments, the methods can further include the following procedures. The base station can receive the first message from the terminal sequentially via at least one third channel within the first channel set. The base station can send the second message to the terminal via a fourth channel, the fourth channel being within the first channel set.

According to some embodiments, the terminal can be preset with at least one network connection plan and channel plan information corresponding to the at least one network connection plan.

According to some embodiments, the second message can further include a channel mask, the channel mask being used to map a first channel subset of the first network connection plan.

According to some embodiments, the second message can further include at least one channel plan information mask, the channel plan information mask being used to map at least one first network connection plan.

According to some embodiments, a terminal is further provided. One exemplary terminal comprises a sending module and a receiving module. The sending module can be configured to send a first message to the base station via a first channel, the first message being used to request access to a network and the first channel being within a first channel set. The receiving module can be configured to receive a second message from a base station via a second channel, the second message comprising channel plan information, the channel plan information being used to determine a first network connection plan, and the second channel being within the first channel set. The sending module can be further configured to determine the first network connection plan according to the channel plan information and access the network via a second base station according to the first network connection plan.

According to some embodiments, the sending module can be further configured to send the first message to the base station sequentially via at least one third channel within the first channel set. The receiving module can be further configured to receive the second message from the first base station via a fourth channel, the fourth channel being within the first channel set.

According to some embodiments, the terminal can be preset with at least one network connection plan and channel plan information corresponding to the at least one network connection plan.

According to some embodiments, the second message can further include a channel mask, the channel mask being used to map a first channel subset of the first network connection plan. The terminal can determine the first channel subset according to the channel plan information and the channel mask and access the network via the second base station according to the first channel subset.

According to some embodiments, the second message can further include at least one channel plan information mask, the channel plan information mask being used to map at least one first network connection plan.

According to some embodiments of the present disclosure, a base station is further provided. One exemplary base station comprises a receiving module and a sending module. The receiving module can be configured to receive first message from a terminal via a first channel, the first message being used to request access to a network and the first channel being within a first channel set. The sending module can be configured to send a second message to the terminal via a second channel, the second message comprising channel plan information. The channel plan information can be used to determine a first network connection plan, and the second channel can be within the first channel set.

According to some embodiments, the receiving module can be further configured to receive the first message from the terminal sequentially via at least one third channel within the first channel set. The sending module can be further configured to send the second message to the terminal via a fourth channel, the fourth channel being within the first channel set.

According to some embodiments, the second message can further include a channel mask, the channel mask being used to map a first channel subset of the first network connection plan.

According to some embodiments, the second message can further include at least one channel plan information mask, the channel plan information mask being used to map at least one first network connection plan.

According to some embodiments of the present disclosure, methods for communications between a terminal and a base station are further provided. According to one exemplary method, a terminal sends a first message to at least one base station via a first channel, the first message being used to request access to a network, the first channel being within a first channel set, and the first channel being used to indicate a first network connection plan. The terminal receives a second message from a first base station via a second channel, the second message being used to cause the terminal to determine the first network connection plan according to the first channel, and the second channel being within the first channel set. The terminal accesses the network via a second base station according to the first network connection plan.

According to some embodiments of the present disclosure, methods for communications between a terminal and a base station are further provided. According to one exemplary method, the base station receives a first message from the terminal via a first channel, the first message being used to request access to a network, the first channel being within a first channel set, and the first channel being used to indicate a first network connection plan. The base station sends a second message to the terminal via a second channel, the second message being used to enable the terminal to determine the first network connection plan according to the first channel, and the second channel being within the first channel set.

According to some embodiments of the present disclosure, a terminal and a base station are further provided. An exemplary terminal can include one or more processors and one or more machine-readable media stored with instructions. The instructions, when executed by the one or more processors, can cause the terminal to perform one or more methods as described above. An exemplary base station can also include one or more processors and one or more machine-readable media stored with instructions. The instructions, when executed by the one or more processors, can cause the base station to perform one or more methods as described above.

According to some embodiments of the present disclosure, machine-readable media are provided. Exemplary media can store instructions which, when executed by one or more processors, can cause a terminal or a base station to perform one or more methods as described above.

With the embodiments of the present disclosure, a channel use plan of a base station can be obtained by a terminal through signaling interactions in the process of network connection. The terminal can determine whether the network can be accessed and complete the process of network access accordingly. The solutions provided herein can improve the efficiency of interactions between the terminal and the base station.

DETAILED DESCRIPTION

In order to facilitate understanding of the features and advantages of the present disclosure, some exemplary embodiments of the present disclosure will be described in further detail below with reference to the accompanying drawings. It is appreciated that the embodiments described herein are merely some examples. Consistent with the present disclosure, other embodiments can be obtained without departing from the principles disclosed herein. Such embodiments shall also fall within the protective scope of the present disclosure.

A LoRaWAN network generally includes terminal nodes, base station nodes, and servers. The terminals can connect with and access a LoRaWAN network. According to different application scenarios, the terminals may include different electronic devices. For example, when the LoRaWAN network is applied in the field of urban management, the terminals may include intelligent power meters. When the LoRaWAN network is applied in a digital home, the terminals may include various smart household appliances.

Also referred to as gateway or concentrator in a LoRaWAN network, a base station has the capabilities of wireless connection and aggregation. A base station can provide terminal(s) with an access point to the LoRaWAN network, forward data from a server or the terminal, and enable data exchange between the terminal and the server. The base station can also perform data exchange by transmitting wireless frames with other base stations within the signal coverage of the base station.

A server may include a server or a server cluster that is configured to perform service processing according to data obtained from a base station or a terminal. The server can further control the operating mode and operating status of the base station or the terminal.

Based on the embodiments of the present disclosure, a terminal can obtain a channel use plan of a base station through network access signaling. The terminal can then determine whether the channel use plan can be used to access the network.

Figure 1:
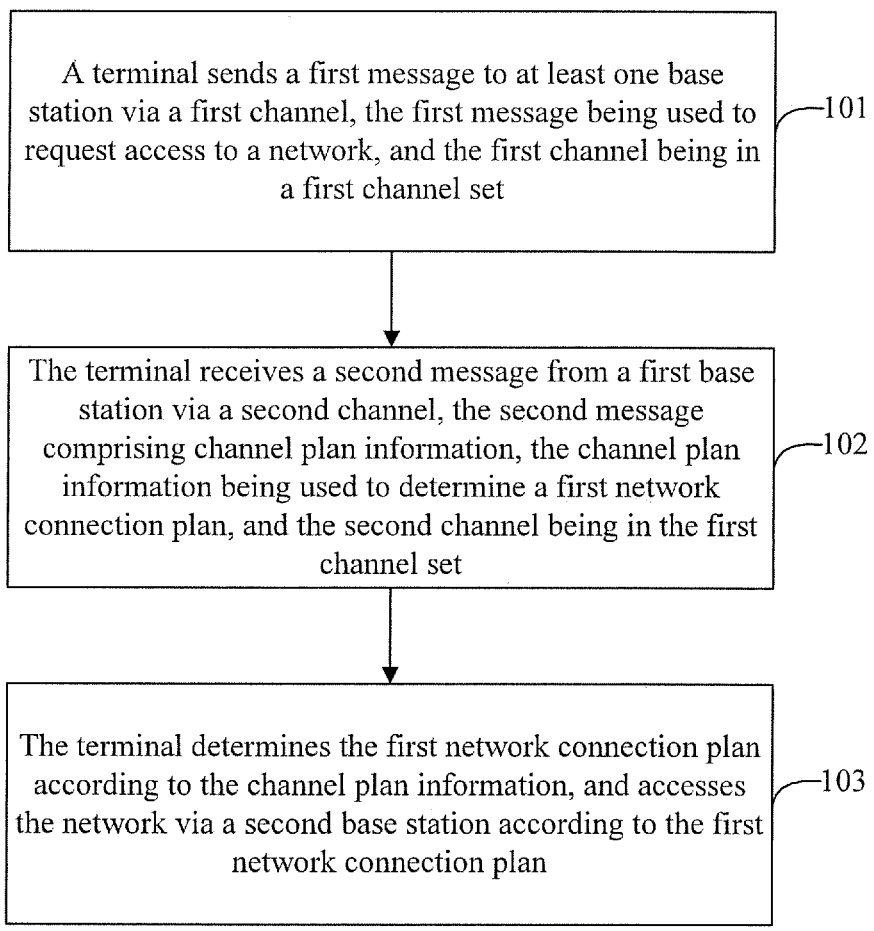
FIG. 1 is a flow chart of an exemplary method for communications between a terminal and a base station, according to some embodiments of the present disclosure.

The process of communications between a terminal and a base station will be described below from the perspective of a terminal, according to some embodiments of the present disclosure. Referring to FIG. 1, a flow chart of an exemplary method 100 for communications between a terminal and a base station according to some embodiments of the present disclosure is provided. The exemplary method 100 can include steps 101-103.

In step 101, a terminal sends a first message to at least one base station via a first channel, the first message being used to request access to a network and the first channel being within a first channel set.

The first channel can be an uplink join channel, and the first message can include a join-request message. For example, the terminal can send a join-request to the base station via a known join channel. The first channel set may include at least one channel in a preset common join channel set between the terminal and the base station. The join-request sent by the terminal can be received by one or more base stations and can further be sent by the one or more base stations to the server. Subsequently, join-accept information can be sent to the terminal via a first base station. The first base station may be within the one or more base stations, or may not be within the one or more base stations. In some embodiments, a common join channel set can be provided between the terminal and the base station. The terminal can send a join-request to the base station via the common join channel set.

For example, with respect to a LoRaWAN spectrum, a join channel can be any channel selected from channel 3 (470.9 MHz), channel 11 (472.5 MHz), channel 19 (474.1 MHz), channel 27 (475.1 MHz), channel 71 (484.5 MHz), channel 79 (486.1 MHz), channel 87 (478.7 MHz), and channel 95 (489.3 MHz). Channels 3, 11, 19, and 27 are uplink join channels, and the other 5 channels are downlink join channels. One uplink join channel and one corresponding downlink join channel form a group. For example, channel 3 and channel 71 are a group of uplink and downlink join channels. The terminal can send a join-request message to the base station via channel 3 and receive a join-accept message from channel 71.

In the embodiments, step 101 can include sub-steps 1011 and 1012.

In sub-step 1011, the terminal sends the first message to the base station sequentially via at least one third channel within the first channel set. The first channel set may be a common join channel set. As the terminal does not know about the working channel information of the base station before accessing the network, the terminal can send a join-request sequentially via uplink join channels in the common join channel set. If no corresponding join-accept message is received in response to the sent join-request, a join-request can be sent to the base station via the next uplink join channel. The process can be repeated until a join-accept message is received.

For example, the terminal can first send a join-request message to the base station via uplink join channel 19. If it is determined that no corresponding join-accept message is received within a prescribed time, the terminal can send a join-request message to the base station via another uplink join channel, for example, uplink join channel 27. If the terminal successfully receives a corresponding join-accept message within the prescribed time, then the terminal does not send a join-request message to the base station via uplink join channel 27. The third channel may be the same as the first channel. The third channel can also be another channel different from the first channel within the first channel set.

In sub-step 1012, the terminal receives a second message from the first base station via a fourth channel, the fourth channel being within the first channel set. The fourth channel may be the second channel (as further described below with respect to step 102), or another downlink join channel other than the second channel in the common join channel set. The second message can include a join-accept message.

Referring back to FIG. 1, in step 102, the terminal receives the second message from a first base station via a second channel, the second message comprising channel plan information, the channel plan information being used to determine a first network connection plan, and the second channel being within the first channel set.

The second channel may be a known downlink join channel. The second message may be a join-accept message. The channel plan information may include a channel plan ID. Channel plan information can represent a network connection plan. A network connection plan can designate channel use planning within a certain spectral range. Channel planning can include information regarding division of all channels within a spectral range, such as information associated with central frequency point, channel width, and the like. Channel planning can further include rules for channel uplink and downlink uses, rules regarding use of special channels, and various other agreements regarding the spectral range.

The join channel set and the network connection plan can have overlapping use portions or can be completely separated. The channel plan information can be in the form of letters or numbers or can be represented in the form of a mask. Further, the channel plan information can be carried in a channel frequency list (CFList) in the join-accept information. The CFList can include information associated with one channel plan or information associated with multiple channel plans. In some embodiments, the CFList can include one set of information associated with one channel plan and one corresponding channel mask. In some embodiments, the CFList can also include multiple sets of information associated multiple channel plans and the corresponding channel masks. For example, the CFList can include channel plan id1, channel mask1, channel plan id2, channel mask2, channel plan id3, and channel mask3.

According to some embodiments of the present disclosure, the terminal can be preset with at least one network connection plan and one set of channel plan information corresponding to the at least one network connection plan.

The network connection plan can include information regarding channel use planning within a spectral range. Channel planning can include division of all channels within a spectral range, such as information associated with central frequency point, channel width, and the like. Channel planning can further include rules for channel uplink and downlink uses, rules regarding use of special channels, and various other agreements regarding the spectral range. For example, the channel plan information may include a channel plan ID. Channel plan ID can represent a network connection plan. For example, channel plan ID 1 can indicate a channel allocation plan at 20 MHz, and the channel plan ID 2 can indicate a channel allocation plan at 30 MHz. It is appreciated that the above channel plan IDs and the number of channel plan IDs are only exemplary. They are not intended to limit the scope of the present disclosure.

According to some embodiments, the second message can further include a channel mask. The channel mask can be used to map a first channel subset of the first network connection plan.

The channel mask can refer to a string of binary code (or character string) that can respectively correspond to each channel or channel subset, in a one-to-one relationship. The channel mask can indicate whether the current channel or channel subset is available. In some embodiments, the channel mask can be sent, as a part of CFList field in the join-accept message, to the terminal. The terminal can obtain the channel mask from the first base station, and calculate to obtain uplink and downlink data channels for interaction with the second base station. That is, uplink and downlink data channels for interaction with the second base station can be obtained through calculation using the channel mask. The first base station can deploy a part of or all channels of the first channel set. The second base station can deploy a part of or all channels in the first network connection plan. The first base station and the second base station can be located on the same base station entity, or they may not be on the same base station entity. In some embodiment, the base station may also be a gateway.

In some embodiments, the terminal can determine the first channel subset according to the channel plan information and the channel mask and can access the network via the second base station according to the first channel subset. For example, the terminal can obtain a corresponding channel planning plan based on a channel plan ID. The terminal can further obtain uplink and downlink data channels for interacting with the base station based on the channel mask. An uplink data packet can be sent to the base station via the uplink channel.

According to some embodiments, the second message can further include at least one channel plan information mask. The channel plan information mask can be used to map at least one network connection plan. As noted above, the channel plan information can be in the form of a channel plan ID, which can represent a certain network connection plan. The channel plan ID mask can be used, instead of the channel plan ID, to represent the network connection plan. For example, bit1 can represent a network connection plan 1, bit2 can represent a network connection plan 2, and the like. The second message may be join-accept information. The join-accept information can carry one channel plan information mask. The join-accept information may also carry multiple channel plan information masks.

Referring back to FIG. 1, in step 103, the terminal determines the first network connection plan according to the channel plan information and accesses the network via the second base station according to the first network connection plan.

For example, the terminal can obtain the channel plan information, such as the channel plan ID, and the corresponding network connection plan. The terminal can send uplink data via the uplink channel prescribed in the network connection plan. The terminal can further receive, according to a receiving window obtained through calculation, a downlink data packet sent from the base station.

Figure 2:
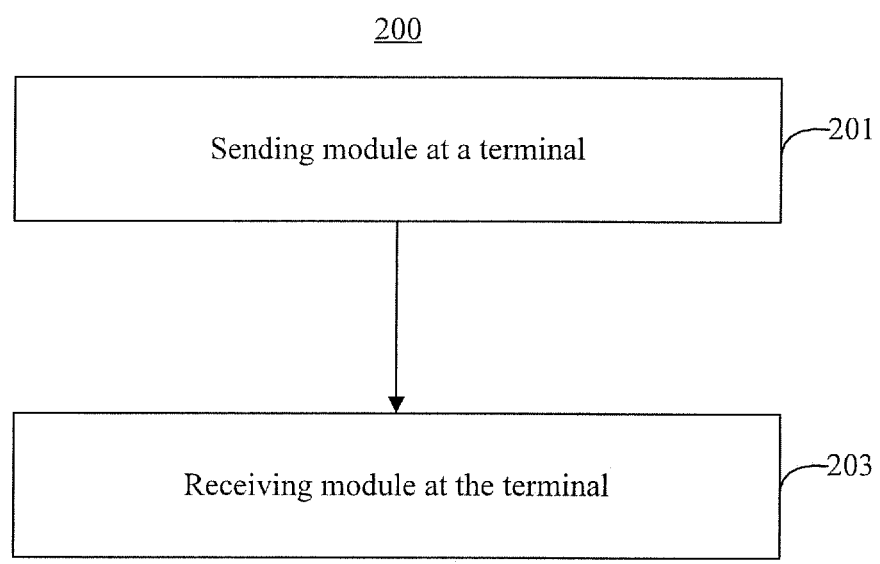
FIG. 2 is a structural block diagram of an exemplary terminal for communications with a base station, according to some embodiments of the present disclosure.

FIG. 2 illustrates a structural block diagram of an exemplary terminal 200 for communications with a base station according to some embodiments of the present disclosure. As shown in FIG. 2, the exemplary terminal 200 can include a sending module 201 and a receiving module 203

Sending module 201 can be configured to send a first message to at least one base station via a first channel, the first message being used to request access to a network and the first channel being within a first channel set.

Receiving module 203 can be configured to receive a second message from a first base station via a second channel, the second message including channel plan information. Channel plan information can be used to determine a first network connection plan, and the second channel can be within the first channel set.

In some embodiments, sending module 201 can be further configured to determine the first network connection plan according to the channel plan information, and access the network via a second base station according to the first network connection plan.

In some embodiments, sending module 201 can be further configured to send the first message to the base station sequentially via at least one third channel within the first channel set. Receiving module 203 can be further configured to receive the second message from the first base station via a fourth channel, the fourth channel being within the first channel set.

According to some embodiments, the terminal can be preset with at least one network connection plan and one set of channel plan information corresponding to the at least one network connection plan.

According to some embodiments, the second message can further include a channel mask. The channel mask can be used to map a first channel subset of the first network connection plan. The terminal can determine the first channel subset according to the channel plan information and the channel mask and access the network via the second base station according to the first channel subset.

According to some embodiments of the present disclosure, the second message can further include at least one channel plan information mask. The channel plan information mask can be used to map at least one first network connection plan.

Figure 3:
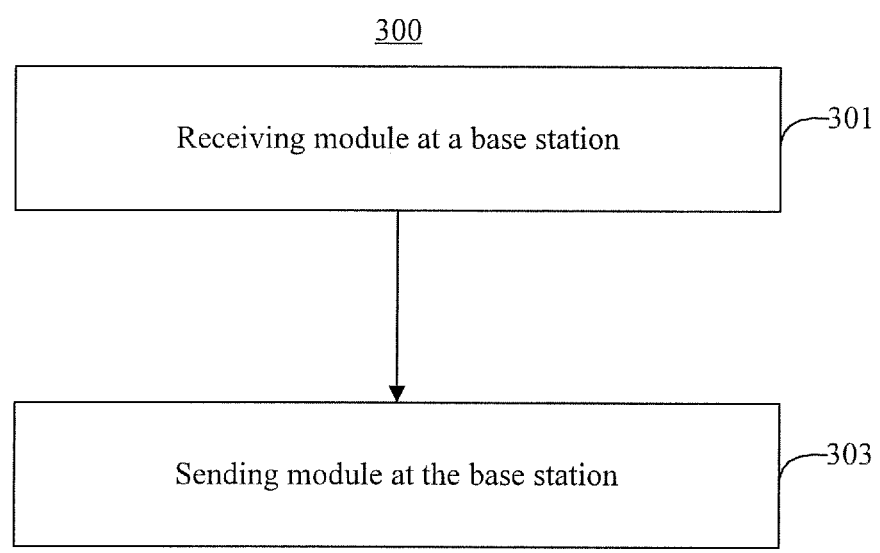
FIG. 3 is a structural block diagram of an exemplary base station for communications between a terminal, according to some embodiments of the present disclosure.

FIG. 3 is a structural block diagram of an exemplary base station 300 for communications with a terminal according to some embodiments of the present disclosure. The exemplary base station 300 can include a receiving module 301 and a sending module 303.

Receiving module 301 can be configured to receive a first message from a terminal via a first channel, the first message being used to request access to a network and the first channel being within a first channel set.

Sending module 303 can be configured to send a second message to the terminal via a second channel. The second channel can be within the first channel set. The second message can include channel plan information. Channel plan information can be used to determine a first network connection plan.

In some embodiments of the present disclosure, receiving module 301 can be further configured to receive the first message from the terminal sequentially via at least one third channel within the first channel set. Sending module 303 can be further configured to send the second message to the terminal via a fourth channel, the fourth channel being within the first channel set.

In some embodiments, the second message can further include a channel mask. The channel mask can be used to map a first channel subset of the first network connection plan.

In some embodiments, the second message can further include at least one channel plan information mask. The channel plan information mask can be used to map at least one first network connection plan.

Figure 4:
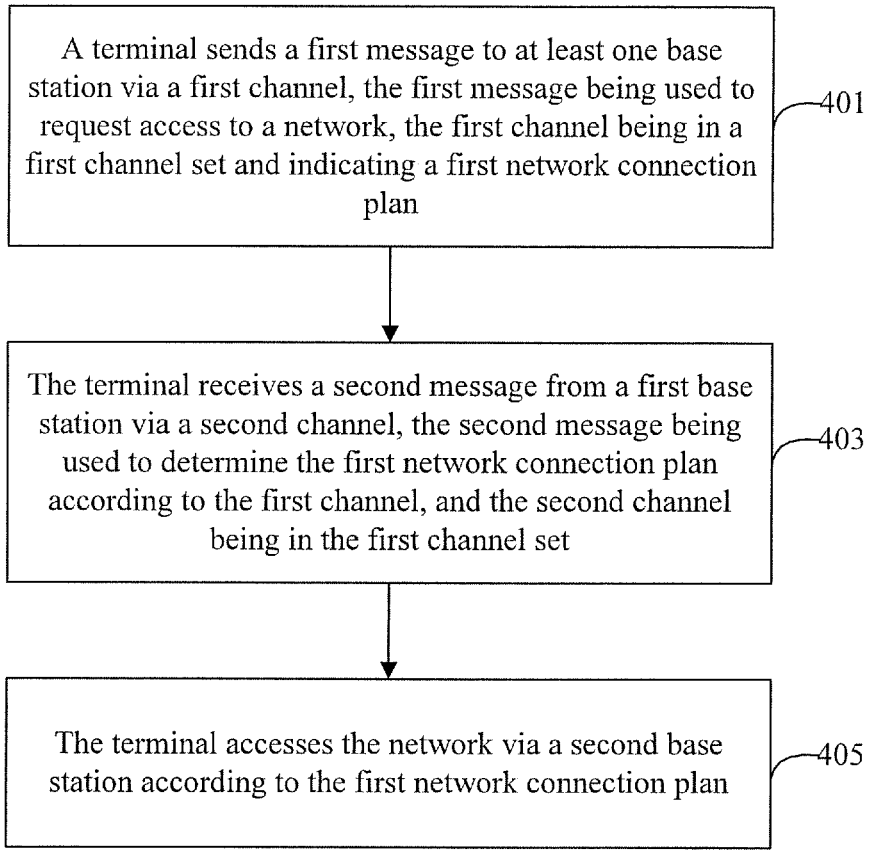
FIG. 4 is a flow chart of an exemplary method for communications between a terminal and a base station.

FIG. 4 is a flow chart of an exemplary method 400 for communications between a terminal and a base station according to some embodiments of the present disclosure. As shown in FIG. 4, the exemplary method 400 can include the following steps 401-405.

In step 401, a terminal sends a first message to at least one base station via a first channel, the first message being used to request access to a network, the first channel being within a first channel set. The first cannel can be used to indicate a first network connection plan.

For example, the first channel can be a known uplink join channel. The first message can be a join-request message. The terminal can send a join-request to the base station via a known join channel. The first channel set can include one or more channels in a preset common join channel set between the terminal and the base station. Further, the join-request sent by the terminal can be received by one or more base stations and can further be sent by the one or more base stations to a server. Subsequently, the join-accept information can be sent to the terminal via a first base station. The first base station may be within the one or more base stations or may not be within the one or more base stations.

The first channel can be used to indicate the first network connection plan, or its association with the first network connection plan. For example, an uplink join channel 1 can indicate or represent a network connection plan I, and an uplink join channel 11 can indicate or represent a network connection plan II. In some embodiments, more than one uplink join channels can indicate the same network connection plan. For example, uplink join channels 1-4 can all indicate or represent a network connection plan I.

In step 403, the terminal receives a second message from a first base station via a second channel. The second message can be used by the terminal to determine the first network connection plan according to the first channel. The second channel can be within the first channel set;

For example, the second channel may be a known downlink join channel. The second message may include a join-accept message. The network connection plan can include information regarding channel use planning within a spectral range. The channel planning can include division of all channels within a spectral range, such as central frequency point, channel width, and the like. The channel planning can further include rules for channel uplink and downlink uses, rules regarding use of certain special channels, and various other agreements on the spectrum. The join channel set and the network connection plan can include overlapping portions. They can be completely separated.

Upon receiving the join-accept message via the downlink join channel, the terminal can determine its own network connection plan according to the network connection plan indicated by the corresponding uplink join channel. In some embodiments, if no corresponding join-accept message is received in the corresponding downlink join channel after the terminal has sent the first message via an uplink join channel, the terminal can continue to send the first message via the next uplink join channel. The selection of the next uplink join channel from the first channel set can be either a random selection or based on a certain order.

Further, the first channel can also be the second channel. That is, the first channel and the second channel can be the same channel. For example, when the terminal operates in a time-division duplex mode, one channel can be used to act as an uplink join channel and a downlink join channel at the same time.

In step 405, the terminal accesses the network via a second base station according to the first network connection plan.

Upon receiving the join-accept message via a downlink channel, the terminal can determine a network connection plan, according to the network connection plan indicated by the uplink channel corresponding to the downlink channel. The terminal can send uplink data via the uplink channel prescribed in the network connection plan. The terminal can further receive, according to a receiving window obtained through calculation, a downlink data packet sent from the base station.

It is appreciated that the exemplary terminal 200 and base station 300 may perform procedures similar to those described above with the method embodiments. Reference can be made to the corresponding description provided above.

Figure 5:
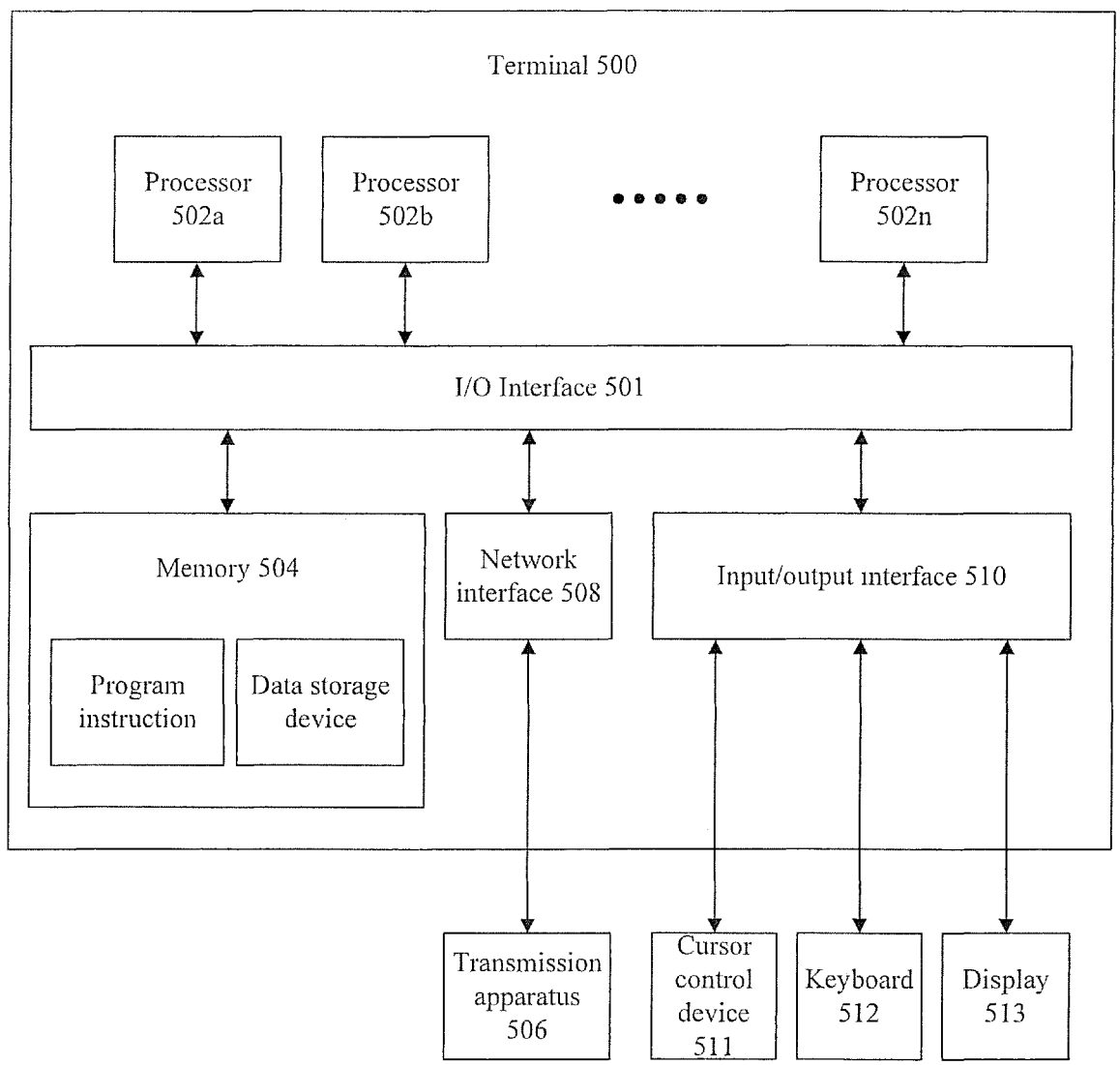
FIG. 5 is a structural diagram of an exemplary terminal according to some embodiments of the present disclosure.

FIG. 5 is a structural diagram of an exemplary terminal 500 according to some embodiments of the present disclosure. As shown in FIG. 5, terminal 500 can include I/O interface 501, one or more processors 502, a memory 504, a transmission apparatus 506, a network interface 508, and an input/output interface 510. The exemplary apparatus 500 may further include a cursor control device 511, a keyboard 512, and a display 513.

Processor(s) 502 can include, but is not limited to, a CPU, a microprocessor MCU, a programmable logic device FPGA, an accelerator, or another processing apparatus. Memory 504 can be used to store data. Transmission apparatus 506 can be used for a communication function. It is appreciated that the structure shown in FIG. 5 is merely an example, which does not limit the actual structure of the foregoing electronic apparatus. In some embodiments, terminal 500 can further include more or fewer components than those shown in FIG. 5, or can have a configuration different from that shown in FIG. 5. For example, terminal 500 can further include components such as a Universal Serial Bus (USB) port (which can also be included as a port of the I/O interface), a network interface, a power source, or a camera.

It is appreciated that the one or more processors 502 or other data processing circuits can be referred to as a data processing circuit. The data processing circuit can be wholly or partially embodied hardware, firmware, or any other combination thereof and can involve software. In addition, the data processing circuit can be a single separate processing module. The data processing circuit can also be wholly or partially integrated into another element in terminal 500.

Memory 504 can be used to store software programs and modules of application software. For example, memory 504 can store program instructions corresponding to methods for monitoring a network connectivity status of a network device as provided in the present disclosure. Processor(s) 502 can execute the software program and modules stored in the memory 504 to implement various functional applications and data processing. For example, processor(s) 502 can execute the instructions for performing methods for monitoring a network connectivity status of a network device as described above. Memory 504 can include a high speed random access memory and can further include a non-volatile memory such as one or more magnetic storage apparatuses, a flash memory, or other non-volatile solid-state memories. In some embodiments, memory 504 can further include memories remotely disposed with respect to processor(s) 502. The remote memories can be connected to terminal 500 through a network. Examples of the network include, but are not limited to, the Internet, an intranet, a local area network, a mobile communications network, and a combination of the above.

Transmission apparatus 506 can be configured to receive or send data through a network. For example, the network can include a wireless network provided by a communications provider of terminal 500. In some embodiments, transmission apparatus 506 can include one or more Network Interface Controllers (NICs), which can be connected to other network devices through a base station, to communicate via the Internet. Further, transmission apparatus 506 can also be a Radio Frequency (RF) module, which can enable communication with the Internet in a wireless manner. It is appreciated that each of the NICs can include the sending modules and the receiving modules described above.

Display 513 can be, for example, a touch-screen Liquid Crystal Display (LCD). The LCD can enable a user to interact with a user interface of terminal 500.

It is appreciated that in some embodiments, terminal 500 shown in FIG. 5 can include hardware elements (such as circuits), software elements (such as computer codes stored in a computer readable medium), or a combination of hardware elements and software elements. It should be appreciated that FIG. 5 is only an example. Components included in the terminal may vary and is not limited by the description herein.

It should be appreciated that in some embodiments, terminal 500 shown in FIG. 5 can include a touch display, also referred to as touch screen or touch display screen. In some embodiments, terminal 500 can include a Graphical User Interface (GUI) allowing the user to interact with the GUI through finger touch or gestures on a touch-sensitive surface. Computer executable instructions for implementing these interactive functions can be configured/stored in one or more computer program products or computer readable storage mediums.

In some embodiments, terminal 500 can execute program codes to perform the following procedures of a method for communications between a terminal and a base. A terminal comprises a sending module and a receiving module. The sending module sends a first message to at least one base station via a first channel for requesting access to a network. The first channel can be within a first channel set. The receiving module receives a second message from a first base station via a second channel. The second message comprises channel plan information that is used to determine a first network connection plan. The second channel can also be in the first channel set. The terminal determines the first network connection plan according to the channel plan information and accesses the network via a second base station according to the first network connection plan.

In some embodiments, processor(s) 502 can further execute program codes to perform the following procedures. The sending module sends the first message to the base station sequentially via at least one third channel within the first channel set. The first channel set may be a common join channel set. As the terminal does not know about the working channel information of the base station before accessing the network, the sending module can send a join-request sequentially via uplink join channels in the common join channel set. If no corresponding join-accept message is received in response to the sent join-request, a join-request can be sent to the base station via the next uplink join channel. The process can be repeated until a join-accept message is received. The terminal receives the second message from the first base station via a fourth channel. The fourth channel can be within the first channel set. The fourth channel can be the second channel or another downlink join channel other than the second channel in the common join channel set.

In some embodiments, processor(s) 502 can further execute program codes to perform the following procedures. The terminal can be preset with at least one network connection plan and one set of channel plan information corresponding to the at least one network connection plan.

In some embodiments, the second message can include a channel mask that is used to map a first channel subset of the first network connection plan. The channel mask can refer to a string of binary code (or character string) that can respectively correspond to each channel or channel subset, in a one-to-one relationship. The channel mask can indicate whether the current channel or channel subset is available. The terminal can determine the first channel subset according to the channel plan information and the channel mask and can access the network via the second base station according to the first channel subset.

In some embodiments, the second message can include at least one channel plan information mask that is used to map at least one network connection plan.

According to some embodiments of the present disclosure, a terminal and a base station are provided. One exemplary terminal can include one or more processors, and one or more machine-readable media stored with instructions therein. When executed by the processors, the instructions can cause the terminal to perform one or more methods according to the embodiments of the present disclosure. It is appreciated that one exemplary base station can include components similar to those described above. When executed by the processors, the instructions can cause the base station to perform one or more methods according to the embodiments of the present disclosure.

According to some embodiments of the present disclosure, machine-readable media stored with instructions are further provided. The storage media can store instructions corresponding to one or more method embodiments provided in the present disclosure. When executed, the instructions can cause a device to perform one or more method embodiments provided in the present disclosure.

It is appreciated that the exemplary embodiments described above may focus on different aspects. If details of other aspects are not provided in one embodiment, reference can be made to corresponding or similar disclosure in other embodiments.

Further, consistent with the above description, it is appreciated that the embodiments of the present disclosure may be provided as methods, devices, or implemented in the form of computer program products. For example, the embodiments of the present disclosure may be implemented as a complete hardware embodiment, a complete software embodiment, or an embodiment combing software and hardware. Moreover, the present disclosure may be in the form of a computer program product or computer usable storage media including computer executable instructions therein. The computer program products or computer usable storage media may include, but not limited to, a magnetic disk memory, CD-ROM, an optical memory, and the like.

Some exemplary embodiments of the present disclosure are described above with reference to the accompanying flow charts or block diagrams. It should be appreciated that some or all the procedures or modules described with reference to the flow charts or block diagrams can be implemented through computer program instructions. For example, the computer program instructions can be provided to a computer, an embedded processor, or a processor of another programmable data processing device, thereby producing a machine with corresponding functions. When the instructions are executed by the processor of the computer or another programmable data processing device, the processor or device can perform corresponding functions or procedures as described above in the present disclosure or shown in the accompanying flow charts or blocks in the block diagrams.

Further, these computer program instructions can also be stored in computer readable storage media capable of guiding a computer or other programmable data processing devices to work in a particular manner. That way, the instructions stored in the computer readable storage media can cause the computer or device to implement functions described herein or shown in the accompanying flow charts or blocks in the block diagrams. Specifically, the computer program instructions can be loaded onto a computer or other programmable data processing terminal devices. The instructions can then cause a series of operating steps to be executed on the computer or other programmable terminal devices. Accordingly, the instructions can cause the computer or other programmable terminal devices to implement functions or processes described herein or shown in the flow charts or one or more blocks in the block diagrams.

In addition, functional units or modules in the above-described embodiments of the present disclosure may be integrated into one processing unit, or each of the units may exist alone physically, or two or more units are integrated into one unit. When the foregoing integrated units are implemented in a form of a software functional unit, the integrated units may be stored in a computer-readable storage medium. The software functional unit can be stored in a storage medium and includes several instructions for instructing a computer device or a processor to perform some or all of the steps of the method embodiments of the present disclosure. The computer device may be a personal computer, a server, or a network device. The foregoing storage medium can include any medium that can store program codes, such as a USB flash drive, a mobile hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It is appreciated that relational terms used herein, such as first and second, are only used to differentiate one entity or operation from another entity or operation. Such terms do not necessarily require or indicate any mandatory sequence, order, or relationship between the described entities or operations. Moreover, terms such as "including," "comprising" or any other variations thereof may encompass non-exclusive inclusion. That is, a process, method, terminal, or device comprising a series of elements may not only include these elements, but also other elements that are not specifically listed, or elements that are inherent to the process, method, terminal, or device. Further, without specific, manifest restrictions, elements described using the statement "comprising one . . . " may include one or more similar elements. That is, a process, method, terminal, or device may include one or more identical or similar elements described therein.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Exemplary methods and devices for communications between a terminal and a base station, and for a terminal to access a network, according to some embodiments of the present disclosure are described in detail above. It is appreciated that the described embodiments are only examples for the purpose of illustrating the principles and implementations of the present disclosure. The above description of the exemplary embodiments is only used to facilitate understanding of the concepts of the present disclosure. Modifications can be made by a person skilled in the art to the specific implementation manners described above, consistent with the present disclosure.

In view of the foregoing, the content of the above description shall not be construed as limitations to the present disclosure. Consistent with the present disclosure, a person skilled in the art can make additional variations and modifications in other embodiments. Such variations and modifications shall all fall within the scope of the present disclosure.

What is claimed is:

1. A method for communications, comprising:
   sending, by a terminal, a first message to at least one base station sequentially via a third channel and a first channel, the first message being used to request access to a network, the third channel being within a same first channel set as the first channel;
   receiving, by the terminal, a second message from a first base station of the at least one base station via a second channel, the second message including channel plan information indicating a first network connection plan;
   determining, by the terminal, the first network connection plan according to the channel plan information; and
   accessing, by the terminal, the network via a second base station of the at least one base station according to the first network connection plan.

2. The method according to claim 1, further comprising:
   receiving, by the terminal, the second message from the first base station via a fourth channel, the fourth channel being within the first channel set.

3. The method according to claim 1, wherein the terminal is preset with the at least one network connection plan and the channel plan information corresponding to the at least one network connection plan.

4. The method according to claim 1, wherein the first channel indicates the first network connection plan.

5. The method according to claim 1, wherein the second message further includes at least one channel plan information mask that is used to map at least one of the first network connection plan.

6. A method for communications, comprising:
sending, by a terminal, a first message to at least one base station via a first channel, the first message being used to request access to a network;
receiving, by the terminal, a second message from a first base station of the at least one base station via a second channel, the second message including channel plan information indicating a first network connection plan and including a channel mask that is used to map a channel subset of the first network connection plan;
determining, by the terminal, the first network connection plan according to the channel plan information;
determining, by the terminal, the channel subset according to the channel plan information and the channel mask; and
accessing, by the terminal, the network via a second base station of the at least one base station according to the first network connection plan and the channel subset.

7. The method according to claim 6, further comprising:
sending, by the terminal, the first message to the at least one base station sequentially via at least one third channel, the at least one third channel being within a same first channel set as the first channel; and
receiving, by the terminal, the second message from the first base station via a fourth channel, the fourth channel being within the first channel set.

8. The method according to claim 6, wherein the terminal is preset with at least one of the first network connection plan and the channel plan information corresponding to the at least one network connection plan.

9. The method according to claim 6, wherein the first channel indicates the first network connection plan.

10. A terminal for communications, comprising:
a sending module including circuitry to send a first message to at least one base station sequentially via a third channel and a first channel, wherein the first message is used to request access to a network, the third channel being within a same first channel set as the first channel;
a receiving module including circuitry to receive a second message from a first base station of the at least one base station via a second channel, the second message comprising channel plan information indicating a first network connection plan; and
a processor configured to determine the first network connection plan according to the channel plan information, wherein the first network connection plan is used by the terminal to access the network via a second base station of the at least one base station.

11. The terminal according to claim 10, wherein
the receiving module further includes circuitry to receive the second message from the second base station via a fourth channel that is within the first channel set.

12. The terminal according to claim 10, wherein the terminal is preset with the at least one network connection plan and the channel plan information corresponding to the at least one network connection plan.

13. The terminal according to claim 10, wherein the first channel indicates the first network connection plan.

14. The terminal according to claim 10, wherein the second message further includes at least one channel plan information mask that is used to map at least one of the first network connection plan.

15. A terminal for communications, comprising:
a sending module including circuitry to send a first message to at least one base station via a first channel, wherein the first message is used to request access to a network;
a receiving module including circuitry to receive a second message from a first base station of the at least one base station via a second channel, the second message comprising channel plan information indicating a first network connection plan and comprising a channel mask that is used to map a channel subset of the first network connection plan, wherein the terminal uses the channel plan information and the channel mask to determine the channel subset; and
a processor configured to determine the first network connection plan according to the channel plan information, wherein the first network connection plan and the channel subset are used by the terminal to access the network via a second base station of the at least one base station.

16. The terminal according to claim 15, wherein
the sending module includes circuitry to send the first message to the at least one base station sequentially via at least one third channel that is within a same first channel set as the first channel; and
the receiving module includes circuitry to receive the second message from the second base station via a fourth channel that is within the first channel set.

17. The terminal according to claim 15, wherein the terminal is preset with at least one of the first network connection plan and the channel plan information corresponding to the at least one network connection plan.

18. The terminal according to claim 15, wherein the first channel indicates the first network connection plan.

19. A non-transitory computer readable medium that stores a set of instructions that is executable by at least one processor of a computer to cause the computer to perform a method for communications, the method comprising:
sending a first message to at least one base station sequentially via a third channel and a first channel, the first message being used to request access to a network, the third channel being within a same first channel set as the first channel;
receiving a second message from a first base station of the at least one base station via a second channel, the second message including channel plan information indicating a first network connection plan;
determining the first network connection plan according to the channel plan information; and
accessing the network via a second base station of the at least one base station according to the first network connection plan.

20. The non-transitory computer readable medium according to claim 19, wherein the set of instructions that is executable by the at least one processor of the computer causes the computer to further perform:
receiving the second message from the first base station via a fourth channel, the fourth channel being within the first channel set.

21. The non-transitory computer readable medium according to claim 19, wherein the terminal is preset with the at least one network connection plan and the channel plan information corresponding to the at least one network connection plan.

22. The non-transitory computer readable medium according to claim 19, wherein the first channel indicates the first network connection plan.

23. The non-transitory computer medium according to claim 19, wherein the second message further includes at least one channel plan information mask that is used to map at least one network connection plan.

24. A non-transitory computer readable medium that stores a set of instructions that is executable by at least one processor of a computer to cause the computer to perform a method for communications, the method comprising:
sending a first message to at least one base station via a first channel, the first message being used to request access to a network;
receiving a second message from a first base station via a second channel, the second message including channel plan information indicating a first network connection plan and including a channel mask that is used to map a channel subset of the first network connection plan;
determining the first network connection plan according to the channel plan information;
determining the channel subset according to the channel plan information and the channel mask; and
accessing the network via a second base station of the at least one base station according to the first network connection plan and to the channel subset.

25. The non-transitory computer readable medium according to claim 24, wherein the set of instructions that is executable by the at least one processor of the computer causes the computer to further perform:
sending the first message to the at least one base station sequentially via at least one third channel, the at least one third channel being within a same first channel set as the first channel; and
receiving the second message from the first base station via a fourth channel, the fourth channel being within the first channel set.

26. The non-transitory computer readable medium according to claim 24, wherein the terminal is preset with at least one of the first network connection plan and the channel plan information corresponding to the at least one network connection plan.

27. The non-transitory computer readable medium according to claim 24, wherein the first channel indicates the first network connection plan.

* * * * *